United States Patent [19]

DePenti

[11] 4,236,645
[45] Dec. 2, 1980

[54] WEARPLATE FOR A COUPLER SHANK PINHOLE

[75] Inventor: Kenneth L. DePenti, Mayfield Heights, Ohio

[73] Assignee: Midland-Ross Corporation, Cleveland, Ohio

[21] Appl. No.: 891,742

[22] Filed: Mar. 30, 1978

[51] Int. Cl.³ .................................................. B61G 9/20
[52] U.S. Cl. ........................................ 213/69; 213/72
[58] Field of Search ............... 213/69, 64, 67 R, 62 R, 213/61, 51, 62 A, 72; 52/716; 308/DIG. 7, DIG. 8, DIG. 9, 238, 239

[56] References Cited

U.S. PATENT DOCUMENTS

| 1,542,728 | 6/1925 | Regan et al. | 213/62 R |
|---|---|---|---|
| 2,865,691 | 12/1958 | Muller | 308/238 |
| 2,973,103 | 2/1961 | Tack | 213/64 |
| 3,587,660 | 6/1971 | Dion | 308/238 |
| 3,961,689 | 6/1976 | Leskovec | 308/DIG. 7 |
| 4,055,254 | 10/1977 | Chierici | 213/61 |
| 4,120,404 | 10/1978 | Chierici et al. | 213/61 |
| 4,133,434 | 1/1979 | Chierici | 213/61 |

Primary Examiner—Charles E. Frankfort
Attorney, Agent, or Firm—Harlan E. Hummer

[57] ABSTRACT

A coupler having a coupler head and a shank which extends from the coupler head and terminates at a butt end adjacent which a pinhole is formed for receiving a pivot pin that is used to pivotally mount the coupler on a railroad car, mine car, etc. A semi-cylindrical recess is formed in the backside of the pinhole closest the butt end of the shank for receiving a matingly configured wearplate that is held captive in the recess between the pivot pin and adjacent butt end of the shank. The wearplate is composed of an ultra high molecular weight polymer.

7 Claims, 8 Drawing Figures

WEARPLATE FOR A COUPLER SHANK PINHOLE

BACKGROUND OF THE INVENTION

U.S. Pat. Nos. 3,635,356; 3,716,146; 3,760,954 and 3,888,358 all relate to typical metal wearplates or bearing blocks which are utilized in the pinholes of coupler shanks. Such bearing blocks are not resilient but rigid, are usually bulky and cumbersome, and difficult to handle and maintain in position within the pinhole of the coupler shank. The invention is directed to the provision of a simple, highly approved wearplate and mechanism for maintaining it captured within the pinhole of a coupler shank.

Briefly stated, the invention is in a coupler used in coupling a plurality of cars together in tandem. The coupler comprises a shank having a butt end adjacent which is located a pinhole that extends transversely through the shank for receiving a pivot pin that pivotally mounts the shank. The pinhole includes an elongated recess which is disposed in the backside of the pinhole closest the butt end of the shank and which extends longitudinally of the pinhole. A non-metallic replaceable wearplate, composed of an ultra high molecular weight polymer, is disposed in the recess between the butt end of the shank and pivot pin which extends through the pinhole. Means are provided for maintaining the wearplate captive in the recess.

DESCRIPTION OF THE DRAWING

The following description of the invention will be better understood by having reference to the annexed drawing, wherein.

DESCRIPTION OF THE INVENTION

Figure 1:
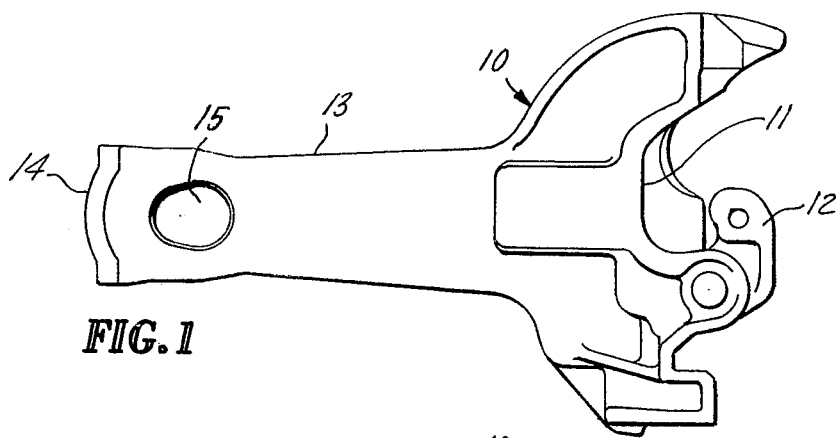
FIG. 1 is a plan view of a coupler employing a preferred embodiment of the invention.
Figure 2:
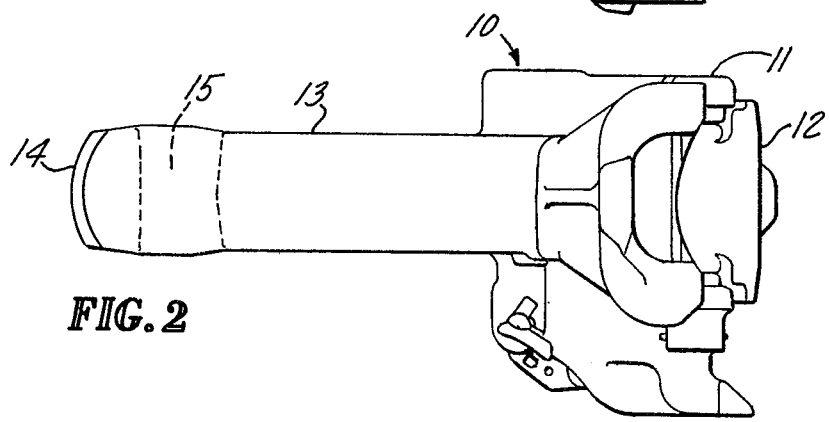
FIG. 2 is a side view of the coupler.

With reference to the drawing, there is shown a coupler 10 which comprises conventional components of a coupler head 11 with coupling means 12, a shank 13 which extends rearwardly from the coupler head 11 and terminates at a butt end 14 that is in opposed relation to the coupler head 11, and a pinhole 15 which extends transversely through the shank 13 adjacent the butt end 14 for receiving a pivot pin 16 that extends longitudinally through the pinhole 15 and used to pivotally mount the coupler 10 on, for example, a railroad car or mine car.

The pinhole 15 is provided with an elongated recess 17 which is disposed in the backside 18 of the pinhole 15 closest the butt end 14 of the coupler shank 13. The length L of the recess 17 is smaller than the overall length L' of the backside 18 of the pinhole 15 adjacent the recess 17, so that opposing, longitudinally spaced curved ends 19,20 of the recess 17 are spaced from adjacent opposing ends 21,22 of the pinhole 15. A pair of arcuate abutments 23,24 are disposed adjacent the opposing curved ends 19,20 of the recess 17. The recess 17 has a pair of opposing longitudinal sides 25,26 adjacent which are disposed a second pair of abutments 27,28. The recess 17 is concavely shaped and has a curved inner periphery 29 that is formed on a simple radius R.

A replaceable, curved wearplate 30 is disposed in the recess 17 between the butt end 14 of the shank 13 and pivot pin 16. The wearplate 30 is at least a segment of a cylinder and has a length L'' which is slightly less than the length L of the recess 17 and is sufficiently resilient to be placed in the pinhole 15 and then sprung into the recess 17 where it is held captive until it becomes badly worn and requires replacement with a new wearplate. The wearplate 30 is matingly configured to conform to the curvature of the recess 17, i.e. the outer curved periphery 31 of the wearplate 30 has a simple radius R' of curvature which is substantially equal to, or, at most, slightly larger than the radius R of curvature of the curved inner periphery 29 of the recess 17, so that the wearplate 30 fits snugly in place, after it is sprung into position within the recess 17.

The wearplate 30 is non-metallic, being composed of any suitable elastomeric material which is resilient and durable under stress, and preferably has a low coefficient of friction with metal so as not to require lubrication. An excellent material is a plastic made and sold by the Holland Company of Illinois under the trademark Hollube. Hollube plastic, as indicated in U.S. Pat. No. 4,055,254, is an ultra high molecular weight polymer which is preferably a polyethylene having a molecular weight in the range of from 2,000,000 to 10,000,000. This particular plastic has a coefficient of sliding or dynamic friction with steel of about 0.02. The plastic wearplate 30, in this instance, has a thickness T of $\frac{3}{8}$ inches and a length of 4 inches.

Portions 32,33 of the lateral sides 34,35 of the pinhole 15 adjacent opposing longitudinal sides 25,26 of the recess 17, are removed to facilitate positioning of the wearplate 30 within the recess 17. The abutments 23,24,27,28 restrict movement of the wearplate 30 within the recess 17, the first pair of abutments 23,24 at the opposing ends 19,20 of the recess 17 restricting longitudinal movement of the wearplate 30 in the recess 17, and the second pair of abutments 27,28 at the longitudinal sides 25,26 restricting rotational movement of the wearplate 30 in the recess 17 and about the longitudinal axis of the pivot pin 16.

Figure 3:
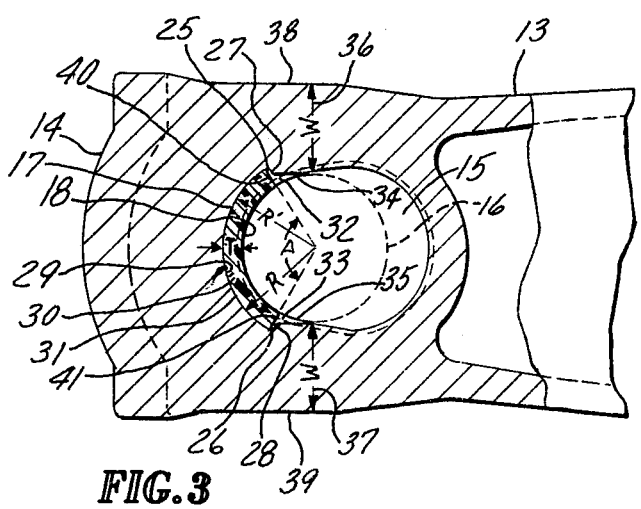
FIG. 3 is a section of the butt end of the shank of the coupler of FIG. 1, as viewed from a plane that is normal to the longitudinal axis of the pinhole.
Figure 4:
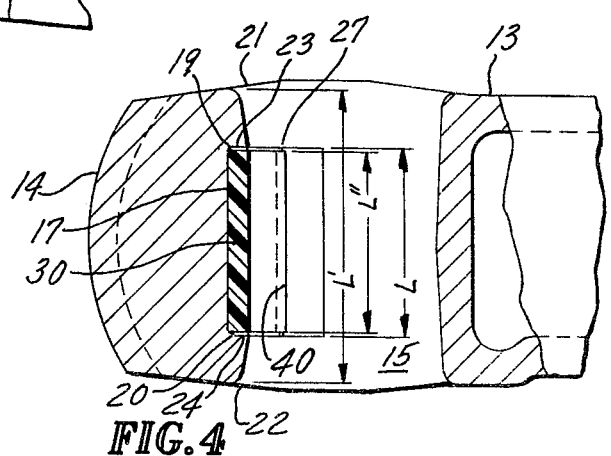
FIG. 4 is a section of the butt end of the shank of the coupler of FIG. 1, as viewed from a plane containing the longitudinal axis of the pinhole.
Figure 5:
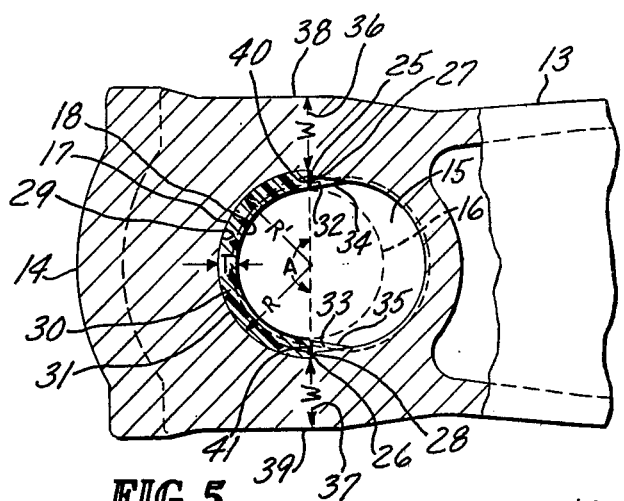
FIG. 5 is a section of the butt end of the shank of a coupler using another embodiment of the invention, as viewed from a plane that is normal to the longitudinal axis of the pinhole.
Figure 6:
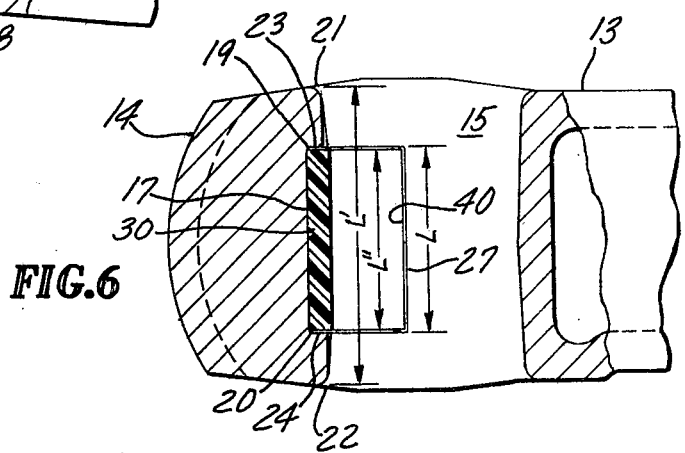
FIG. 6 is a section of the butt end of the shank of the coupler of FIG. 5, as viewed from a plane containing the longitudinal axis of the pinhole.

The width W of the sections 36,37 between the pinhole 15 and adjacent lateral sides 38,39 of the coupler shank 13 is critical and, if too narrow, can develop cracks which cause breakage of the coupler shank 13. Therefore, it is desireable to maintain the greatest section width W possible between the pinhole 15 and adjacent lateral sides 38,39 of the coupler shank 13. Accordingly, as best seen by a comparison of FIGS. 3, 5 and 7 it is better to use the narrower segment cylindrical wearplate 30 of FIGS. 3 and 4, rather than the larger, semi-cylindrical wearplate 30 of FIGS. 5-8. The included angle A between radially oriented planes containing opposing longitudinal sides 40,41 of the narrower segment wearplate 30 of FIGS. 3 and 4 is preferably about 120°, whereas that of the wearplate 30 of FIGS. 5-8 is 180°. It has been found that the narrower segment wearplate 30 of FIGS. 3 and 4 provides an adequate wearing surface to prevent contact of the pivot pin 16 with the pinhole 15 and is more economical to manufacture by the formation of a plastic cylinder which is then cut longitudinally into three equal segments, rather than in half or into two equal segments to form the semi-cylindrical wearplates 30 of FIGS. 5-8.

Figure 7:
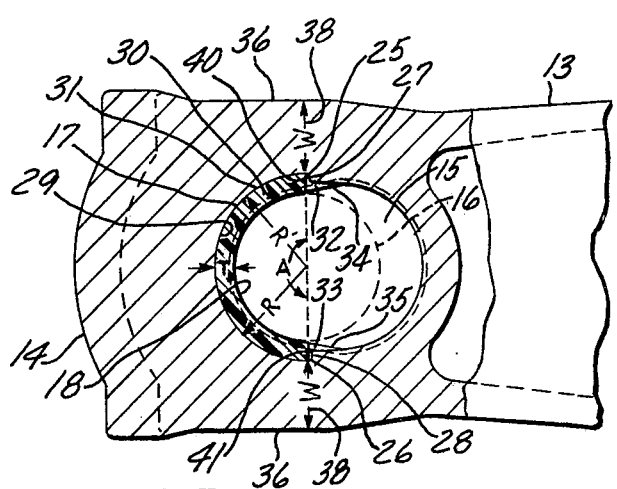
FIG. 7 is a section of the butt end of the shank of a coupler utilizing still another embodiment of the invention, as viewed from a plane which is normal to the longitudinal axis of the pinhole.
Figure 8:
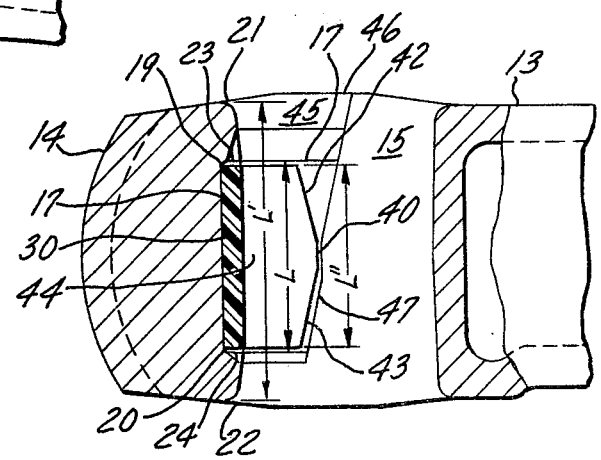
FIG. 8 is a section of the butt end of the shank of the coupler of FIG. 7, as viewed from a plane that contains the longitudinal axis of the pinhole.

With reference to the embodiment of FIGS. 7 and 8, the longitudinal sides 40,41 of semi-cylindrical wearplate 30 each include a pair of marginal edges 42,43 that coverage in a direction away from the semi-cylindrical body portion 44 of the wearplate 30. The opposing lateral sides 34,35 of the pinhole 15 are each provided with a tapering slot 45 which extends from the uppermost top portion 46 of the coupler shank 13 to the recess 17, so that the wearplate 30 can be inserted into the recess 17 from the uppermost top portion 46 of the coupler shank 13 without severely distorting the wearplate 30 which, in this instance, can be more rigid than the wearplate 30 of FIGS. 3-6. The lowermost side portion 47 of the recess 17 is inclined in corresponding relation to the adjacent sloped marginal edge 42 of the wearplate 30 to facilitate insertion of the wearplate 30 into the recess 17 and removal therefrom.

Thus, there has been provided a simple recess and wearplate arrangement for preventing undue wear of the pinhole, thereby extending the life of the coupler shank.

What is claimed is:

1. A car coupler, comprising:
   (a) a shank having a butt end adjacent which is located a pinhole that extends transversely through the shank for receiving a pivot pin on which the shank is pivotally mounted, the pinhole including an elongated recess which is disposed in the backside of the pinhole closest the butt end of the shank and which extends longitudinally of the pinhole, the recess, relative to the butt end, having a concave inner periphery which has a simple radius of curvature, the recess having a pair of opposing ends defining a first pair of abutments continuously therealong and a pair of longitudinally extending opposing sides defining a second pair of abutments continuously therealong; and
   (b) a replaceable wearplate disposed in the recess between the butt end of the shank and pivot pin extending through the pinhole, the wearplate being resilient so that opposing longitudinal sides thereof are capable of being resiliently deflected towards each other so that the wearplate can be inserted in the pinhole and sprung into the recess, the wearplate being at least a segment of a hollow cylinder, the convex outer periphery of which has a simple radius of curvature which is substantially equal to the radius of curvature of the concave inner periphery of the recess, the wearplate having a pair of opposing ends which contact along their entire extent the first pair of abutments to restrict longitudinal movement of the wearplate within the recess, and a pair of longitudinally extending opposing marginal sides which contact along their entire extent the second pair of abutments to restrict rotational movement of the wearplate within the recess about the longitudinal axis of the pinhole, the wearplate having a uniform thickness between opposing marginal sides thereof.

2. The car coupler of claim 1, wherein the wearplate is nonmetallic, being a polymer having an ultra high molecular weight.

3. The car coupler of claim 2, wherein the polymer is polyethylene having a molecular weight in the range of from 2,000,000 to 10,000,000.

4. The car coupler of claim 3, wherein the radius of curvature of the outer periphery of the wearplate is slightly greater than the radius of curvature of the inner periphery of the recess.

5. The car coupler of claim 3, wherein the included angle, between converging radially oriented planes containing opposing longitudinal sides of the wearplate, is in the range of from 120°-180°.

6. The car coupler of claim 5, which includes a configured slot disposed in at least each of the lateral sides of the pinhole adjacent the recess, the slots extending from the recess to the uppermost top portion of the pinhole when the coupler shank is in a normally horizontal position, the slots being provided so that the wearplate can be inserted into the recess from the uppermost top portion of the pinhole without substantial distortion of the wearplate.

7. The car coupler of claim 6, wherein the lowermost marginal edges of the recess and wearplate are matingly inclined in a direction towards the uppermost top portion of the pinhole and away from the backside of the pinhole.

* * * * *